United States Patent [19]

Gannis et al.

[11] Patent Number: 4,938,987
[45] Date of Patent: Jul. 3, 1990

[54] PRODUCTS AND PROCESS FOR PREPARING LOW-FAT ROASTED NUTS

[75] Inventors: Peter Gannis, Stamford; Howard Wilkins, Brookfield, both of Conn.

[73] Assignee: Nabisco Brands, Inc., East Hanover, N.J.

[21] Appl. No.: 401,103

[22] Filed: Aug. 31, 1989

[51] Int. Cl.$^5$ ................................................. A23L 1/36
[52] U.S. Cl. ...................................... 426/632; 426/417
[58] Field of Search ............................... 426/417, 632

[56] References Cited

U.S. PATENT DOCUMENTS

| | | | |
|---|---|---|---|
| 1,850,971 | 3/1932 | Rosenfield | 426/632 |
| 2,003,415 | 6/1935 | Ammann | 426/632 |
| 3,294,549 | 12/1966 | Vix et al. | 426/632 |
| 3,645,752 | 2/1972 | Baxley | 426/632 |
| 3,740,236 | 6/1973 | Baxley | 426/632 |
| 4,049,833 | 9/1977 | Gannis et al. | 426/632 |
| 4,329,375 | 5/1982 | Holloway, Jr. et al. | 426/632 |
| 4,466,987 | 8/1984 | Wilkins et al. | 426/632 |

OTHER PUBLICATIONS

Pominski et al, 1971, Storage of Raw Pressed Peanuts and Roasted Partially Defatted Peanuts Southern Regional Research Laboratory, ARS-USDA, New Orleans, LA, APREA, p. 1.

*Primary Examiner*—Donald E. Czaja
*Assistant Examiner*—Helen Pratt

[57] ABSTRACT

The present invention relates to a process for preparing low-fat roasted nuts. This process comprises pressing raw redskin nuts with a moisture content of 6% or greater to remove about 40% to about 52% of their oil content and then roasting the nuts. The resulting nuts are low in fat yet retain a significant portion of their flavor-imparting substituents.

23 Claims, No Drawings

PRODUCTS AND PROCESS FOR PREPARING LOW-FAT ROASTED NUTS

BACKGROUND OF THE INVENTION

It has long been desired to defat nuts, thereby lowering their caloric content. However, it has often been difficult to remove significant amounts of fat from nuts without simultaneously diminishing their flavor. The present invention avoids this problem with a process of defatting nuts where the nuts retain a greater portion of their natural flavor.

The term "nuts" as used in this description includes whole nuts and pieces of nuts such as peanuts, almonds, Brazil nuts, filberts, pecans, walnuts, and the like. For conciseness, the following disclosure will center around the production of low-fat peanuts. It is not, however, limited to peanuts, because the principles of the present invention, as it relates to peanuts, are also applicable to other nuts.

The basic procedures for preparing partially-defatted nuts by pressing oil from them have been known for a number of years. U.S. Pat. Nos. 2,003,415 to Ammann and 3,294,549 to Vix et al. disclose examples of such processes. Broadly, these methods involve pressing nuts until the desired quantity of oil is removed and then steaming or cooking the partially-defatted nuts in water until the nuts are reconstituted to substantially their original size and shape. The nuts have a substantially high moisture content. Further work on the process of Vix et al. is described in a series of articles entitled "Development and Potential of Partially Defatted Peanuts," *Peanut Journal and Nut World*, January and February 1967, and an article entitled "Low Calorie Peanuts," *Food Processing/Marketing*, September 1965.

Later workers, encouraged by the appeal of low fat products to weight conscious consumers, continued work in this area.

U.S. Pat. No. 3,740,236 to Baxley indicates that roasted peanut flavor appears to be reduced in proportion to the percentage of the peanut oil removed during the pressing process. Baxley, however, does not attempt to prevent this flavor loss but, instead, provides a process for improving the flavor of the nuts after defatting. In this process, the defatted nuts are reconstituted in an aqueous binder solution which may contain flavors.

U.S. Pat. No. 3,645,752 to Baxley discloses a process of improving the flavor of partially-defatted nuts by quenching them in a flavored oil after roasting.

U.S. Pat. No. 4,049,833 to Gannis et al. also recognizes the adverse effect defatting has on the flavor and texture of partially-defatted nuts and suggests reconstituting the partially-defatted nuts with a glycerol-containing solution prior to roasting. When roasted, the reconstituted nuts are disclosed to have an improved flavor, texture, and storage stability.

U.S. Pat. No. 4,329,375 to Holloway, Jr. et al. discloses a process for producing low fat nuts which retain more of their natural flavor and aroma. This involves preroasting the nuts, pressing them to partially remove the oil, and then completing roasting. An improvement on this process is disclosed by U.S. Pat. No. 4,466,987 to Wilkins et al.

The exact reason for the flavor loss in partially-defatted nuts is not fully understood. The Doctoral Dissertation of M. E. Mason, entitled "Procedures in Studying and Factors Influencing the Quality and Flavor of Roasted Peanuts," (Oklahoma State University, 1963, pp. 63 and 64), indicates that oil pressed from peanuts contains aleurone grains, among other particulates, which appear to contain flavor precursors. The Mason dissertation, however, was not concerned with the preparation of low-fat nuts, but simply with gaining a better knowledge of the source and identification of flavor principles in peanuts.

SUMMARY OF THE INVENTION

The present invention relates to an improved process for preparing partially-defatted nuts which retain a greater degree of their natural nut flavor. As a result, the partially-defatted nuts produced by this process have an overall combination of texture, flavor, and mouthfeel more closely resembling nut products containing their natural oil content. Nevertheless, this peanut product has a significantly reduced calorie content.

The process of the present invention involves pressing raw redskin nuts with a moisture content of 6% to 7% or greater under conditions effective to remove about 40% to 52% of the oil content of the nuts. The pressed nuts are then blanched and roasted to develop their flavor and color fully.

DETAILED DESCRIPTION OF THE INVENTION

By utilizing the process of the present invention, partially-defatted nuts of all varieties can be produced with a greater degree of their natural flavor and aroma retained. The nuts can be whole or split depending upon the desired end use.

Preferably, the nuts used in the process of this invention are decorticated—i.e., the nut shell is removed prior to pressing—to save energy and to enable efficient moisture control. Blanching—i.e., removing the skin—is also advantageously employed in the practice of this invention with the point at which the nuts are blanched being varied, as determined by the skilled artisan. For example, the skins of partially-defatted redskin peanuts to be air-roasted can be removed either before or after roasting to improve the flavor of the nuts. However, nuts to be granular-roasted, as described in more detail below, should be blanched prior to roasting to avoid contamination of the heat transfer vehicle with pieces of skin. Desirably, the nuts are blanched without the traditional heating to loosen their skins.

Surprisingly, it has been found that raw redskin nuts at a moisture content above about 6% and preferably about 6% to about 7%, can be effectively defatted without conventional hydration treatment. Although not wishing to be bound by theory, it is believed that traditional defatting methods produced nuts which had a non-uniform moisture content and at least some protein denaturation. In such processes, nuts, such as peanuts, were pre-wetted to a uniform moisture content of less than about 10% and pre-roasted to loosen the skins and facilitate blanching prior to pressing. Further, according to previous teachings, the moisture content of the nuts during pressing was thought to be critical with a narrow range of acceptability (i.e., 3.5% to 4.5%). It was felt that moisture contents below 3.5% would cause excessive breakage and that moisture levels above 4.5% would block oil removal and significantly extend the press time (i.e., by a factor of 2 or more). Further, the present invention's avoidance of a pre-wetting step precludes leaching of soluble materials from the nuts, and oil is readily removed.

The peanuts are pressed according to any technique which will extract about 40% to about 50% of the initial oil content of the nut. This can be achieved, for example, by employing a Carver press at applied pressures of greater then about 1,000 psig for about 15 to about 120 minutes. Although the exact oil extraction pressure can be varied to control the degree and rate of extraction, pressures of less than about 1500 psig, are preferred. The pressure is preferably brought up to the desired level as quickly as possible. It should be recognized, however, that although pressures much higher than 1500 psig will achieve more rapid oil extraction, the nuts may be more extensively damaged and the level of retained natural flavor reduced. By contrast, pressures below 1,000 psig may cause less breakage of nuts, but the time required for oil extraction will greatly increase. A desirable balance between calorie content and final product flavor and texture can be achieved by reducing oil content to between about 40% and about 52%.

After pressing, the nuts are flattened and undesirably dense, so they must be returned to approximately their original size and shape. It is desired to obtain post-roasting bulk densities of less than about 0.40 grams per cubic centimeter (g/cc), with levels in the range of about 0.32 to about 0.39 g/cc being particularly desirable. Products with these bulk densities have significantly reduced calorie levels but still retain a nut-like crunch and chew. These bulk densities are determined by filling a 500 cubic centimeter graduated cylinder with nuts, determining the weight of the nuts, and dividing the weight in grams by the volume in cubic centimeters.

After partial defatting, the nuts must be roasted to obtain a final roasted nut product. Roasting can be accomplished in any suitable manner, such as by the art-recognized technique of dry-roasting, to achieve the desired degree of flavor and color development while at the same time drying the nuts to a moisture content low enough to obtain the desired crunch and chew. When dry-roasting, the pressed nuts must be first wetted by contacting them with sufficient water to reconstitute them not during the contact with water but when subsequently roasted. Such contact is at a temperature of 40° F. to 80° F. with a level of 3 to 7, preferably 4, pounds of water per hundred pounds of nuts. At such ratios, the nuts can be efficiently wetted without significant loss of flavor components which will occur when greater quantities of water are utilized. Nut-water contact can be in any suitable mixing device such as a rotatable coating drum. If the partially defatted nuts are instead oil roasted, no wetting is required.

Advantageously in the practice of the present invention, nuts are dry-roasted or granularly roasted—i.e., by contacting the nuts with a finely divided heat transfer vehicle. An Agtron color photometer can be employed to standardize the degree of roast. Typically, this device is employed in the green mode with 12% and 33% plates defining the scale on which a reading of about 60 to about 95 is preferred. Most preferably, the reading will be within the range of about 80 to about 90.

In dry roasting, the nuts are roasted in a stream of hot air at a temperature of about 275° F. to about 400° F., preferably about 320° F. to about 335° F., for a time sufficient to achieve the desired roasting of the particular type of nut being processed. For example, the time and extent of roasting will be greater for peanuts (i.e., about 10 minutes to about 30 minutes) than for cashews (i.e., about 3 minutes to about 15 minutes). The most appropriate conditions to be adopted in any particular instance can be readily determined by the skilled artisan.

In granular roasting, the nuts are contacted with a finely divided heat transfer vehicle which is heated to a temperature of about 315° F. to about 465° F., preferably about 380° F. to about 410° F. The contact will vary depending upon the particular type of nut being processed, as well as the roasting temperature and the degree of roasting desired. For example, the time and extent of roasting will be greater for peanuts (i.e., about 1 minute to about 9 minutes) than for cashews (i.e., about 0.5 minutes to about 3 minutes). Again, the most appropriate granular roasting conditions can be readily determined by the skilled artisan. The finely divided heat transfer vehicle can be any suitable finely divided material which will absorb heat from a heat source, such as an ignited jet, and transfer heat upon contact with the nuts. The finely divided heat transfer vehicle may be salt, sand, ceramic beads, and metal balls, preferably, ceramic beads.

When the desired degree of roast is achieved, the temperature of the nuts should be rapidly reduced so they are not badly over-roasted or burned. This can be accomplished by dumping them rapidly from the roasting apparatus and flushing them with a stream of ambient air. Air blowing can, however, be eliminated if the nuts are dropped a significant distance from the roasting apparatus and are spread uniformly on an open mesh conveyor.

After roasting, and preferably after cooling, the nuts can be coated with various flavoring agents, allspice, cinnamon, clove, caraway, bay, sage, ginger, basil, and the like, which can be employed alone or with condiments such as salt, pepper, monosodium glutamate, and the like. Also, texturizers such as glycerine and binders such as natural gums, dextrins, gelatin, sugars, and the like, may be applied. Advantageously, a portion or all of the added materials can be introduced prior to completion of the roasting operation. It is particularly beneficial to infuse with flavored oils in accordance with our copending and simultaneously-filed application entitled "Infusion Flavoring Of Partially-Defatted Nuts", which is incorporated by reference.

The following examples are presented for the purpose of further illustrating and explaining the present invention and are not to be taken as limiting in any regard. Unless otherwise indicated, all parts and percentages are by weight and are based on the total weight of the product at that particular stage in processing.

EXAMPLE Ia

This example illustrates the production of low-fat roasted peanuts according to the present invention.

Raw redskin Jumbo Runner peanuts having 7% moisture may be placed in a Carver press and pressed at 1,200 psig for about 20 minutes. The pressure starts at a value of about 500 psig and is gradually raised to the final pressure of 1,200 psig over the period of pressing. Pressing under these conditions removes about 40% of the original oil content of the nuts. The peanuts are then blanched by means of a whole nut blancher. The blanched peanuts are contacted with water at a level of 4 pounds of water per 100 pounds of nuts. The peanuts are then dry roasted by exposing them to a stream of hot air at a temperature of about 325° F. for about 20 minutes to roast the peanuts to a point where they exhibit a 95 reading on the Agtron color photometer employed in the green mode with the scale defined by the 12% and 33% plates. This product exhibits a bulk density of about 0.40 grams per cubic centimeter, has an acceptable appearance with respect to the number of cracks, and has a good texture and flavor.

EXAMPLE Ib

Raw redskin Jumbo Runner peanuts having 7% moisture are treated according to the same procedure as described in Example Ia except that the nuts are pressed at 1,200 psig for about 30 minutes. The pressure starts at a value of about 500 psig and is gradually raised to the final pressure of 1,200 psig over the period of pressing. Pressing under these conditions removes about 52% of the original oil content of the nuts. The final roasted product exhibits a bulk density of about 0.38 grams per cubic centimeter, has an acceptable appearance with respect to the number of cracks, and has good texture and flavor.

As a comparison, the oil reduction percentage and calorie content for 1/5 cup of nuts produced according to Examples Ia and Ib are compared to full-fat peanuts. The results are shown below in Table I.

TABLE I

| Product | Gms. Oil (1/5 cup) | % Oil Reduction | Calories (1/5 cup) | % Calorie Reduction |
|---|---|---|---|---|
| Example Ia | 8.26 | 42.8 | 110.3 | 35.6 |
| Example Ib | 7.28 | 50.3 | 99.3 | 42.0 |
| Full Fat | 14.46 | — | 171.3 | — |

The above description is presented for the purpose of teaching the person of ordinary skill in the art how to make and use the invention. It is not intended to detail all those obvious modifications and variations of the invention which will become apparent to the skilled worker upon reading the description. It is intended, however, that all such obvious modifications and variations be included within the scope of the invention which is defined in the following claims.

I claim:

1. A process for preparing low-fat roasted nuts, comprising:
   (a) pressing raw redskin nuts having a moisture content of 6% or greater under conditions effective to remove about 40% to about 52% of the oil content of the nuts and to form compressed nuts and
   (b) roasting the compressed nuts at substantially the moisture content existing after pressing under conditions effective to develop a roasted nut flavor and color and to return the nuts to an uncompressed, reconstituted form during said roasting.

2. The process of claim 1, wherein said roasting is performed by exposing the nuts to a stream of hot air, said process further comprising:
   contacting the nuts with water at a level of 3 to 7 pounds of water per hundred pounds of nuts prior to said roasting.

3. The process of claim 1, wherein the stream of air is at a temperature of about 275° F. to about 400° F. and said roasting is for a time of about 10 minutes to about 60 minutes.

4. The process of claim 3, wherein the moisture content of the nuts is reduced to no greater than about 2% by said roasting.

5. The process of claim 4, wherein the nuts are peanuts.

6. The process of claim 5, wherein said roasting is continued until the color of the nuts reaches a value of about 60 to about 95 as measured by an Agtron color photometer employing the 12% and 33% plates in the green mode.

7. The process of claim 1, wherein said roasting is performed by contacting the nuts with a finely divided heat transfer vehicle at a temperature of about 315° F. to about 465° F. for a time of about 1 minute to about 9 minutes.

8. The process of claim 7, wherein the vehicle is selected from the group consisting of salt, ceramic beads, sand, and metal balls.

9. The process of claim 8, wherein the vehicle is ceramic beads.

10. The process of claim 9, wherein the nuts are peanuts.

11. The process of claim 1, wherein the nuts are blanched subsequent to said pressing and prior to said roasting.

12. The process of claim 1, wherein the nuts are pressed at a pressure of greater than about 1,000 psig for a time of about 15 minutes to about 120 minutes.

13. A process for preparing low-fat roasted nuts, comprising:
   (a) pressing raw redskin nuts having a moisture content of 6% or greater at a pressure of greater than about 1,000 psig for a time of about 15 minutes to about 120 minutes under conditions effective to remove about 40% to about 52% of the oil content of the nuts and to form compressed nuts;
   (b) blanching the nuts under conditions effective to remove their skins; and
   (c) roasting the compressed and blanched nuts at substantially the moisture content existing after pressing until the color of the nuts reaches a value of about 60 to about 95 as measured by an Agtron color photometer employing the 12% and 33% plates in the green mode and the nuts are returned to an uncompressed, reconstituted form during said roasting.

14. The process of claim 13, wherein said roasting is performed by exposing the nuts to a stream of hot air, said process further comprising:
   contacting the nuts with water at a level of 3 to 7 pounds of water per hundred pounds of nuts prior to said roasting.

15. The process of claim 14, wherein the stream of air is at a temperature of about 275° F. to about 400° F. and said roasting is for a time of about 10 to about 60 minutes.

16. The process of claim 15, wherein the nuts are peanuts.

17. The process of claim 13, wherein said roasting is performed by contacting the nuts with a finely divided heat transfer vehicle selected from the group consisting of salt, sand, ceramic beads, and metal balls at a temperature of about 315° F. to about 465° F. for a time of about 1 minute to about 9 minutes.

18. The process of claim 17, wherein the vehicle is ceramic beads.

19. The process of claim 17, wherein the nuts are peanuts.

20. A process for preparing low-fat roasted nuts, comprising:

(a) pressing raw redskin peanuts having a moisture content of 6% or greater at a pressure of greater than about 1,000 psig for a time of about 15 minutes to about 120 minutes under conditions effective to remove about 40% to about 52% of the oil content of the peanuts and to form compressed peanuts;
(b) blanching the peanuts under conditions effective to remove their skins;
(c) contacting the nuts with water at a level of 3 to 7 pounds of water per hundred pounds of nuts; and
(d) roasting the compressed peanuts at substantially the moisture content existing after pressing until the color of the peanuts reaches a value of about 60 to about 95 as measured by an Agtron color photometer employing the 12% and 33% plates in the green mode and the nuts are returned to an uncompressed, reconstituted form during said roasting, wherein said roasting is performed by air-roasting at a temperature of about 275° F. to about 400° F. for a time of about 10 minutes to about 60 minutes.

21. The nuts produced according to the process of claim 1.

22. The nuts produced according to the process of claim 9.

23. The nuts produced according to the process of claim 12.

* * * * *